J. WILCOX.
APPARATUS FOR MAKING COMBS, &c.
APPLICATION FILED NOV. 13, 1909.
956,560.
Patented May 3, 1910.
2 SHEETS—SHEET 1.
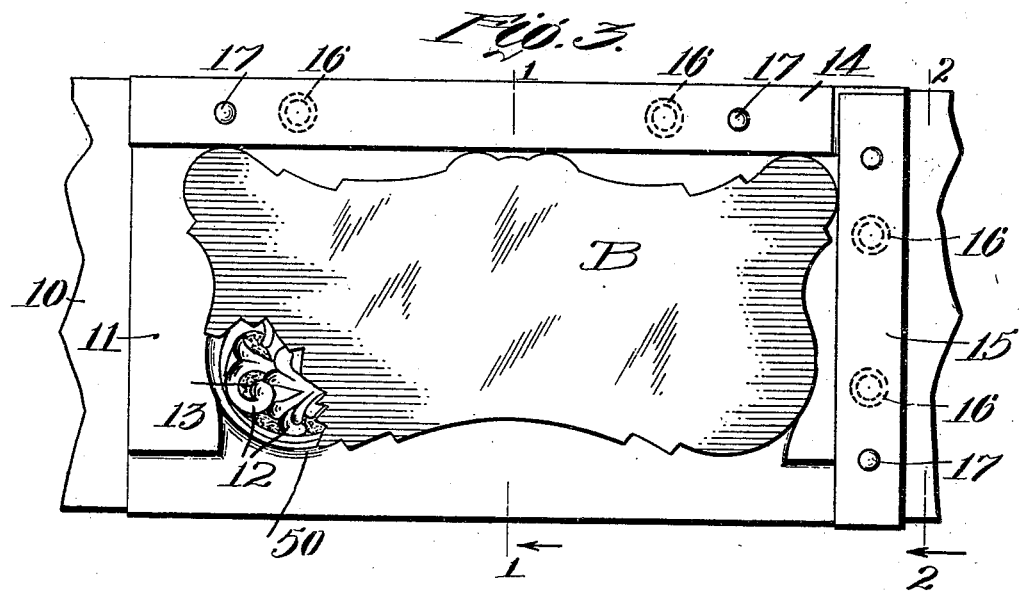
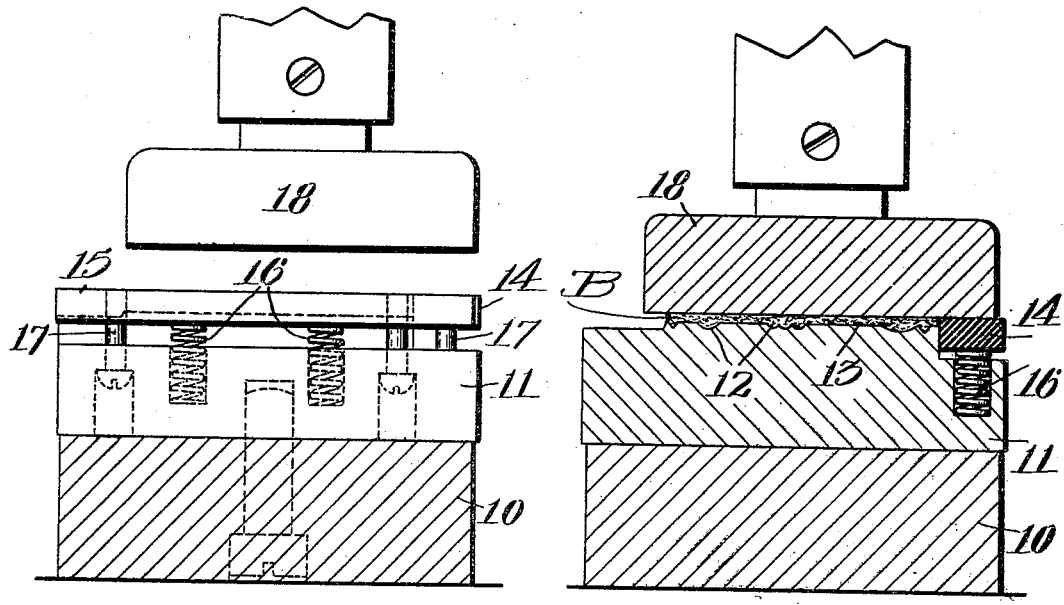
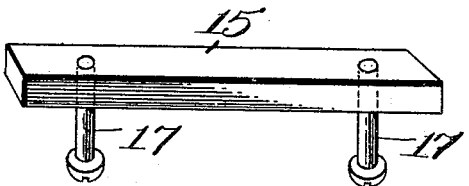

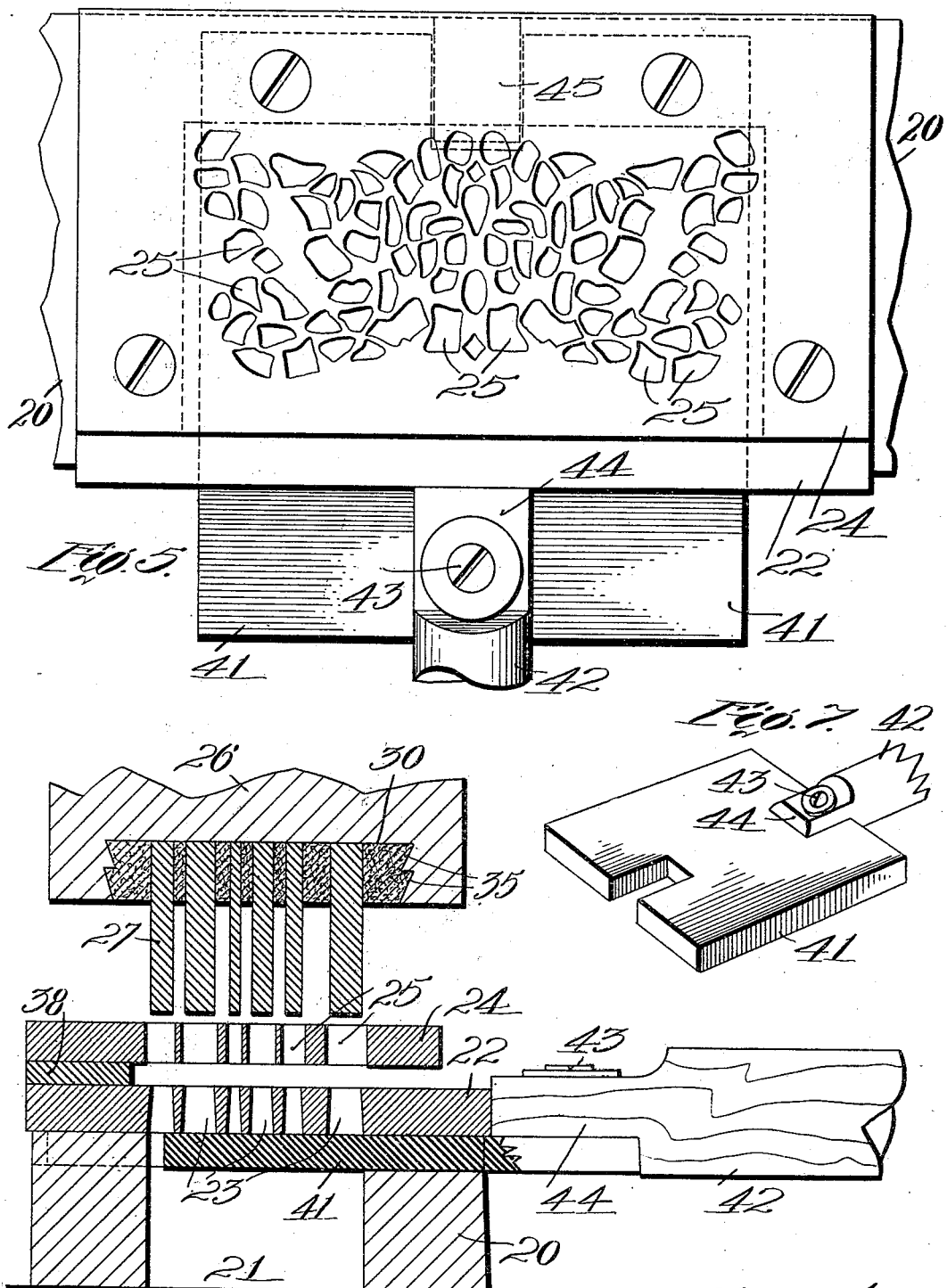

UNITED STATES PATENT OFFICE.

JOSEPH WILCOX, OF ATHOL, MASSACHUSETTS.

APPARATUS FOR MAKING COMBS, &c.

956,560.     Specification of Letters Patent.     Patented May 3, 1910.

Application filed November 13, 1909. Serial No. 527,820.

*To all whom it may concern:*

Be it known that I, JOSEPH WILCOX, a citizen of the United States, residing at Athol, in the county of Worcester and State of Massachusetts, have invented a new and useful Apparatus for Making Combs, &c., of which the following is a specification.

This is chiefly a division of my application for patent on a "Method of making combs" filed April 25, 1908, Serial No. 429,143, but it contains additional matter.

This invention relates to an apparatus for making ornamental backs or other parts of combs and similar articles which are formed from sheets of celluloid, viscoloid, pyroxylin, pyralin, shell, horn, rubber, or any other material from which such articles may be produced.

The principal objects of the invention are to provide a simple and practicable set of dies for producing that class of stamped or molded articles which are perforated and in which the surfaces of the skeleton between the perforations are rounded over so as to produce a pleasing and ornamental effect; to provide an improved punching or cutting die in which the die punches are set in in an inexpensive and accurate manner; to provide means for preventing the breakage of the die plate; and in general to improve and simplify the apparatus for producing this particular type of comb backs and the like.

Reference is to be had to the accompanying drawing which shows a preferred form of the invention, and in which—

Figure 1 is a transverse sectional view of an embossing die and coöperating parts in position for carrying out one step of the procedure. Fig. 2 is a similar view showing the next step, and showing the blank in the act of being embossed. Fig. 3 is a plan of the embossing die with the blank thereon and partly broken away, and the plunger removed. Fig. 4 is a perspective view of one of the gages. Fig. 5 is a plan of the perforating die plate and associated parts. Fig. 6 is a transverse sectional view thereof, showing the die punches, and Fig. 7 is a perspective view of the die plate straightening slide.

The molding and manipulation of celluloid, pyroxylin, and similar plastic materials, to change the form after the same has once been produced or molded in the form of sheets, is attended with many difficulties. In the first place it is well known that the celluloid, as well as kindred substances, tends to return to its original condition, that is, to the first sheet form in which it was originally produced from the shapeless mass of plastic material. Several ways have been devised for attempting to overcome this natural tendency of the celluloid, but there are some forms of articles which have been produced in a permanent condition only with great difficulty and somewhat expensive manipulations. One of these forms is that which is perforated or punched to produce a figure of what may be called a skeleton form and in which it is desired to round over or otherwise ornament the skeleton frame-work between the perforations.

One of the objects of this invention is to provide a simple, convenient, and effective means for accomplishing this result.

According to this invention the results are obtained entirely by means of dies or stamps which are so formed and manipulated that the comb back or the like, is left in a permanent form so that it will retain its shape unless it is heated so as to destroy the condition of the stresses set up in the material. Heretofore in producing this class of perforated work having a large number of perforations, it has some times been necessary to use two or more perforating dies, each one being constructed to produce only a part of the perforations. This was done on account of the high percentage of breakage of the expensive dies. By this invention all the perforations can be made at once, thus saving a large percentage of time in the manufacture of the articles and considerable expense in the making of the dies.

This invention also involves an improvement in the method of setting the punching dies in the head as will appear hereinafter.

The operation of making a hair ornament is as follows:—The blank of sheet material is first cut out by any outline die to give it the proper outline. Then it is heated to the proper degree and placed upon an embossing die which has an intaglio surface provided with rounded edges, so that the projections to be produced on the blank thereby will have rounded or curved surfaces, and so that they need not be further treated after being removed from this embossing die. The embossing die is provided with gages so as to properly locate the blank thereon, and a flat die or plunger is brought down upon the blank from above to press the material into the embossing die. The plunger is left in contact with the blank a short period of time to allow the impression to be made, and the material to set. The plunger is then raised and the blank removed. Then preferably it is immediately placed on a perforated die-plate having gages arranged similarly to the gages connected with the embossing die and having perforations of a location and shape corresponding to the projections on the embossing die, and therefore the depressions produced thereby on the blank. On account of this construction the blank is so located by the gages that it registers with the perforated die. The perforated die preferably is covered at a distance above it by a perforated guide plate of a similar character. A perforating die or punch is then brought down through the two perforated plates so as to punch out the parts of the blank left depressed thereon by the embossing die so as to leave the projecting parts of the bank in bold relief. A removable plate is placed under the perforated die to prevent breakage.

If desired the blank need not be immediately placed in the punching dies after it comes out of the embossing dies, but there may be an interval between the two operations. In this case it is much preferred not to allow this interval to be long enough to permit the blank to entirely cool off. If the blank retains a large amount of its initial heat which it had when it was embossed, it can be slightly reheated between operations without destroying the embossed surface or injuring it in any way, and the process may be carried out in that way, but I prefer to make the process continuous so that no re-heating is required.

Referring to the drawings it will be seen that the set of embossing dies comprises a base 10 on which is mounted the die plate 11. This die is shown as of flat form having an upper intaglio embossing surface which is provided with rounded depressions 12 so as to form rounded projections on the blank. Between the depressions on the die are projections 13 which, when the die is used with the punching dies to be described, may be of any desired character, but when used alone to form ornamental imperforated comb-backs, these projections are provided with a stippled surface, the purpose of which is to produce an ornamental comb or the like of translucent material having an embossed clear figure and a background having numerous small projections constituting a surface contrasting with the embossed portion of the article. Located adjacent to the two edges of the embossing die are gages 14 and 15. The gages are supported by springs 16 and guided by pins 17 or other guides.

The blank B is first cut out by an outline die (not shown) to the proper external shape. Then it is heated, placed on the die plate 11, and pushed back and to one side until it comes against the two gages, which are held above the top of the die plate by the springs. The flat plunger 18 is then brought down toward the die plate and the gages yield to permit the proper compression of the material. This head or plunger has a plane lower surface spaced from the projections 13 so that when in position for embossing (as in Fig. 2) the projections will be spaced from the plane of the plunger. This causes the blank to be embossed only part way through. Along the edge of the embossing portion of this die plate is a depression or groove 50 for receiving the edge of the blank and forming a rim on the article. When the blank has been removed from this die after having been properly pressed and embossed, it is placed on a second set of dies which consists of a base 20 having a central opening 21 therein, and provided with a perforated die-plate 22 having perforations 23 corresponding in location and position with the surface 13 on the embossing die. On the plate 22 are gages 38, located in the same relative position with respect to each other and the design as the gages 14 and 15. The blank is pushed back and to the right until it engages these gages, when its depressions will register with the perforations in the plate 22. Spaced a little above this plate by the gages 38 so as to receive the blank under it is a second perforated plate 24 having similar perforations 25, and above it is a plunger head 26 having die punches 27 corresponding with the perforations.

The die punches or cutting dies 27 preferably are inserted in the head 26 in an improved manner. For this purpose this head is provided with a depression 30 in the face thereof preferably of dove-tailed shape and extending in from the outer surface for an appreciable distance. Its inner walls have inwardly projecting ribs 35. When the die is to be made, the punches are individually set on the bottom of this depression and spaced by means of a separate templet. In order to fix them permanently and securely in position, Babbitt or other metal is cast around them in the depression in the die. This enters the dove-tailed space and the depression between the ribs and securely holds the punches in position, with their ends firmly abutting against the flat floor of the depression. Thus the solid metal of the plunger backs up the punches. These punches are made of tempered steel and on account of the fact that the blanks are heated when the die cutting is to be performed, they may be made with flat lower surfaces, the cutting edges coming into engagement with the cutting edges of the tops of the perforations 23 in such a way as properly to cut the blank. If a design is to be abandoned the soft metal can be melted out and the plunger used again, or even the dies as their temper does not need to be drawn in melting the soft metal.

In order to prevent the breakage of the die plate 22 even when the latter is of comparatively thin construction, and in fact to provide means whereby this die plate can be made comparatively thin, thus saving in the expense of manufacture, and even of the material, a removable steel plate 41 is employed. The base is provided with a horizontal passage in the upper side thereof just under the plate 22 for receiving the removable plate 41. The latter is fixed to its handle 42 by bolt 43 or the like, and the handle extends over the plate and is provided with a projection 44 thereon for engaging the edge of the base or support 20. The plate 41 is provided with a notch at its end in which an integral projection 45 on the base is received. This projection assists in rigidly supporting the die plate 22 above. With this construction it will be seen that with a comparatively thin perforated die plate 22 the danger of breakage is substantially reduced to a minimum, because the steel plate 41 is supported all around its edges by the base 20, and in itself supports the die plate throughout its bottom surface, so that the latter will stand the usage to which it is put. The imporance of this will be obvious when it is understood that the die plates are perforated with a great number of holes, sometimes as many as three hundred in a small die plate of the size shown in the drawings. This steel plate supports all the spaces between the piercing cutters no matter how thin they may be, and it has been found in practice that it renders it practically impossible to break the perforated die plate.

While I have illustrated and described a preferred form of apparatus and disclosed a preferred order of steps for carrying out the method, I am aware that many modifications can be made therein by any person skilled in the art and that the method can be varied in detail without departing from the scope of the invention as expressed in the claims. Therefore I do not wish to be limited to the details shown and described but What I do claim is:—

1. In a device of the character described, the combination of a base, a perforated die plate carried thereby, a set of die punches adapted to be forced down through the perforated plate, said base having an opening under the die plate through which the waste passes, and a flat plate removably carried by said base and located under the perforated plate over said opening to support the same while the die punches are operating upon it.

2. In a device of the character described, the combination of a supporting base having an open center, a perforated die plate supported upon said base at its edges, said base having a horizontal passage therein immediately below the die plate, a set of die punches corresponding in form and position with the perforations in the die plate and adapted to be forced down through them, and a removable plate supported near its edges by said base, fitting in said passage in the base, and located directly under the die plate for supporting the spaces between the perforations thereof while the die punches are operating.

3. In a device of the character described, the combination of a base having an open center, a perforated die plate supported upon said base at its edges, said base having a horizontal opening therein immediately below the die plate, a set of die punches corresponding in form and position with the perforations in the die plate and adapted to be forced down through them, a removable steel plate fitting in said passage in the base and located directly under the die plate for suporting the spaces between the perforations thereof while the die punches are operating, a handle fixed to said plate for operating it, and a buffer mounted on the end of the handle for engaging the front of the base and limiting the position of the die plate.

4. A die plate for making hair ornaments of plastic material comprising a support for a blank, a perforated plate fixed to the support, and a plunger having a cast metal head provided with a dove-tailed opening in its lower surface with ribs on the walls, punches located in said depression and extending perpendicularly to the face of the plunger, and a body of relatively soft cast metal introduced into said depression around said ribs and punches flush with the bottom of the head for holding the punches in position.

In testimony whereof I have hereunto set my hand, in the presence of two subscribing witnesses.

JOSEPH WILCOX.

Witnesses:
 OTHELLO A. FAY,
 KATHERINE G. KEEFE.